US006102362A

United States Patent [19]

Gerber

[11] Patent Number: 6,102,362

[45] Date of Patent: Aug. 15, 2000

[54] GAS MOTOR ACTUATOR

[76] Inventor: David P. Gerber, 16311 Sir William, Spring, Tex. 77379

[21] Appl. No.: 09/148,396

[22] Filed: Sep. 4, 1998

[51] Int. Cl.[7] .................................................... F16K 31/14

[52] U.S. Cl. ................................ 251/59; 251/28; 251/31; 251/285; 137/596.14

[58] Field of Search ................................ 251/59, 28, 285, 251/288, 31; 137/596.14, 596.15, 625.63, 596.1

[56] References Cited

U.S. PATENT DOCUMENTS

| | | | |
|---|---|---|---|
| 2,258,585 | 10/1941 | Hedene | 251/29 |
| 2,743,897 | 5/1956 | Elliott et al. | 251/59 |
| 4,380,325 | 4/1983 | Palmer | 251/14 |
| 4,429,591 | 2/1984 | Zuch et al. | 74/625 |
| 4,687,179 | 8/1987 | Smith | 251/58 |
| 5,038,815 | 8/1991 | Palmer | 137/237 |
| 5,577,532 | 11/1996 | Palmer | 137/460 |
| 5,855,226 | 1/1999 | Palmer | 137/596.18 |

OTHER PUBLICATIONS

EIM Company, Inc., "Type G Brochure—High Pressure Gas Acutator," pp. 1–20, Missouri City, Texas 1995.

Tom Palmer,Inc., "Control Systems—TP III High Pressure Gas Actuator," pp. 1–4, Fulshear, Texas 1981.

Kepner Products Co., "Kepsel Cartridge Lock Valve Inserts," pp. 1–2, Villa Park, Illinois 1995.

*Primary Examiner*—Henry J. Recla
*Assistant Examiner*—Peter deVore
*Attorney, Agent, or Firm*—Akin, Gump, Strauss, Hauer & Feld, LLP

[57] ABSTRACT

A gas motor actuator is provided for opening or closing an actuated valve, such as a pipeline valve, using power gas, which is a gas under pressure. The gas motor actuator includes a gas turbine motor, a high-volume shuttle valve coupled to the gas turbine motor, and a pair of control-limit valve assemblies for delivering power gas to the shuttle valve. One control-limit valve assembly is for opening the actuated valve, and the other is for closing the actuated valve. The gas motor actuator can receive a signal to open or close the actuated valve, which allows pilot gas to open a control valve portion of one of the control-limit valve assemblies, allowing power gas to pass through the control portion to the shuttle valve. The power gas passes through the high-volume shuttle valve, through the gas turbine motor, and back to the shuttle valve for discharge as an exhaust. The power gas rotates a shaft in the gas turbine motor, which, through gears, opens or closes the actuated valve. When the actuated valve becomes fully opened or fully closed, a limit portion of the control-limit valve assembly closes a poppet valve in the control valve portion, which blocks the flow of power gas through the control valve portion so that the flow of power gas to the gas turbine motor is stopped. Efficiency is high, gas consumption is low, and back pressure is low on the gas turbine motor with the high-volume shuttle due to larger ports and additional ports having novel configuration for greater flow area.

28 Claims, 6 Drawing Sheets

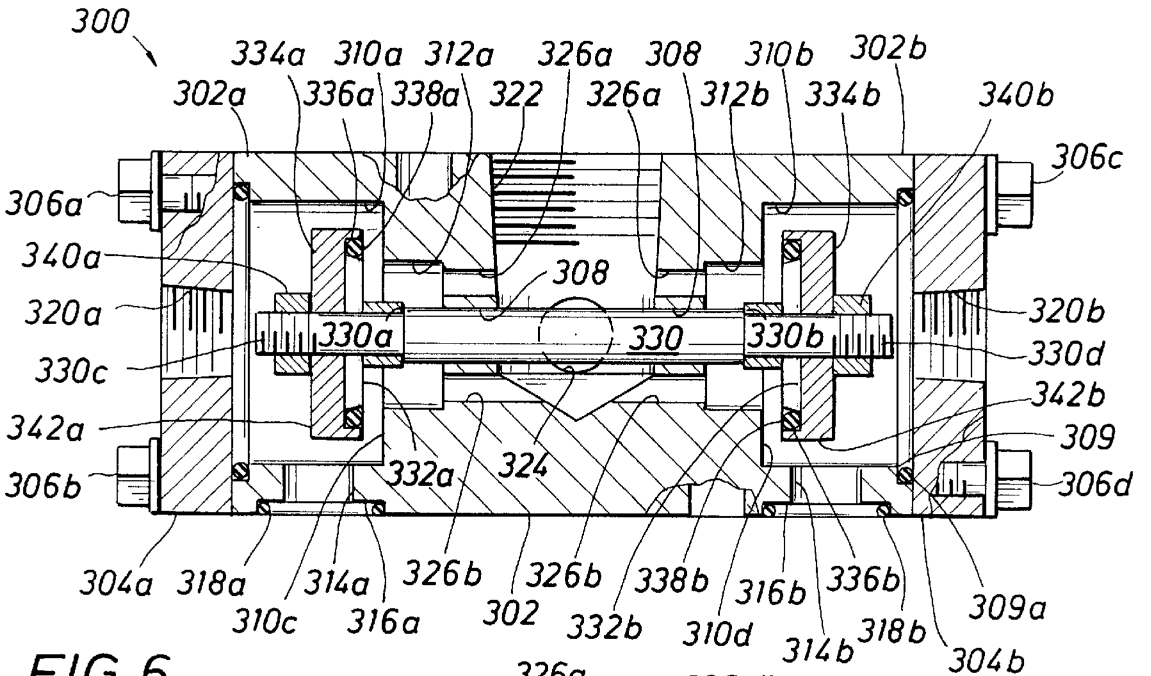
FIG. 6
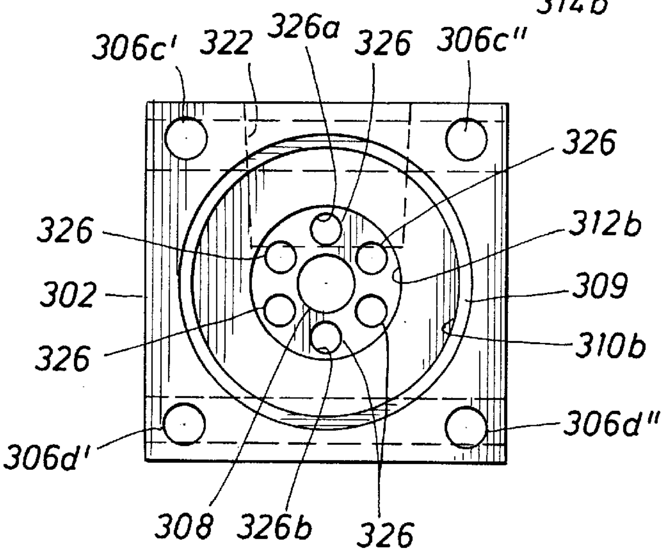
FIG. 7
FIG. 8
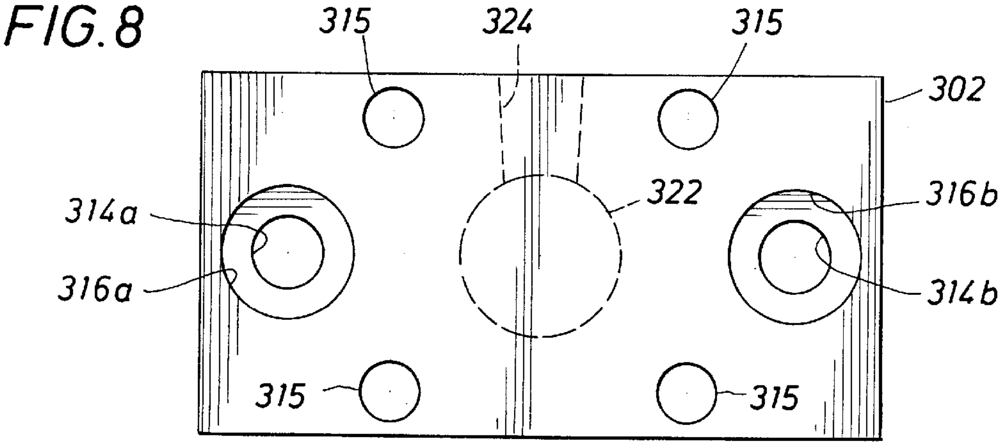

GAS MOTOR ACTUATOR

BACKGROUND OF THE INVENTION

1. Field of the Invention

This invention pertains to actuators for opening and closing valves, and in particular to an actuator using a gas turbine motor.

2. Description of the Related Art

Various actuators are used to open and close valves, and for some applications it is convenient to use a valve actuator with a gas turbine motor, which is referred to as a gas motor actuator. Typically, a gas motor actuator uses gas directly from a pipeline for opening and closing a valve in the pipeline. The actuator is adapted for directly connecting to the valve gearhead, and an output shaft on the actuator is connected to an existing hand wheel shaft. The gas motor actuator includes a gas turbine motor and an assembly of gears.

High-pressure pipeline gas is filtered, lubricated and fed to the gas turbine motor for rotating the motor, which develops a rotational power output for opening or closing a valve. The gas turbine motor has two ports, and gas is fed to one port, passes through a housing, rotating the turbine clockwise and discharges through the other port. The rotational output developed is used to move the valve from, for example, an opened position to a closed position. To move the valve from the closed position to an open position, the rotational output is reversed by reversing the flow direction of the gas by feeding it to the second port and discharging it from the first port.

A system of components typically controls when gas is introduced to the gas turbine motor and when gas flow to the motor is stopped. The flow of gas to the gas turbine motor should begin when a signal is received to either open or close the valve. The gas flow should continue until the valve has either moved from an open position to a closed position or from the closed position to the open position. Finally, gas flow should stop when the valve reaches its fully-opened or fully-closed position, which is the limit of the valve travel. If the valve were to travel beyond this limit, then the valve can be damaged.

One gas motor actuator includes the following components. A selector spool valve is coupled to a gas turbine motor, which feeds gas to and discharges gas from the gas turbine motor for opening and closing an actuated valve. The selector spool valve can be operated manually or by a remote signal to position the selector spool valve to one of three positions: open, close or neutral. The “open” position is for opening an actuated valve; the “close” position is for closing the actuated valve; and the “neutral” position is for neither opening nor closing the actuated valve. When the selector valve spool is placed in the “open” position, high-pressure gas can be fed through the selector spool valve into the first port of the gas turbine motor for opening the actuated valve. The gas then rotates the turbine to develop a rotational output from the gas turbine motor, and the gas is discharged from the second port of the gas turbine motor into the selector valve spool for discharge as an exhaust.

To develop an opposite rotational output from the gas turbine motor, the selector valve spool is placed in the “close” position. When the selector valve spool is in the “close” position, high-pressure gas is passed through the selector valve spool into the second port of the gas turbine motor, where it rotates the gas turbine and discharges through the first port of the gas turbine motor into the selector valve spool for discharge as an exhaust. If the rotational output developed by the gas turbine motor was clockwise when the selector valve spool was in the “open” position, then the rotational output that is developed is counter-clockwise when the selector valve spool is placed in the “close” position. The “neutral” position of the selector valve spool blocks gas flow to either port of the gas turbine motor. Thus, by placing the selector valve spool in the “open” or “close” position, the gas turbine motor rotates until gas flow through the selector valve spool is stopped.

Gas flow to the selector valve spool is stopped when a limit is reached. A limit is reached when the valve moves to a fully-opened or a fully-closed position. A gear assembly is used to indicate when a limit is reached. The gear assembly includes a cam gear and a cam shaft, and cams are threadedly engaged with the cam shaft. As the gas turbine motor rotates, the gear system rotates, which rotates the cam shaft. The cams are adjusted to indicate when the valve is fully opened and fully closed. An open limit valve spool is engaged by one of the cams to indicate when the valve is in a fully-opened position. A close limit valve spool is operatively engaged with the other cam to indicate when the valve is in a fully-closed position. The limit valve spools are used to shut off flow of gas to the selector valve spool when the pipeline valve is at a fully-closed or fully-opened limit.

Thus, high-pressure gas, referred to as power gas, can flow through each of the limit valve spools to the selector valve spool. If, for example, the pipeline valve is fully closed and a signal is received by the selector valve spool to move the pipeline valve to an open position, then power gas flows through the open limit valve spool to the selector valve and through the gas turbine motor to open the pipeline valve. The pipeline valve continues to open until a limit is detected by contact between the cam and the open limit valve spool, which closes the open limit valve spool to stop power gas flow through the open limit valve spool and, consequently, through the selector valve spool. Thus, the pipeline valve is moved from the fully-closed position to the fully-opened position and no farther.

Both limit valve spools and the selector valve spool use O-rings as seals. The O-rings slide over ports where power gas is introduced to or discharged from the spool valve. As the O-ring passes over the port, the O-ring expands into the port, and as it slides past the port, it is cut by a wall forming the port. Consequently, operation of these spool valves deteriorates the O-ring seals. When the O-ring seals are deteriorated or destroyed, power gas blows by and is discharged to the atmosphere, which is an undesirable release of gas from the pipeline into the atmosphere. Further, a relatively large amount of power gas is required to open or close a pipeline valve, which is also a release of pipeline gas into the atmosphere.

Another gas motor actuator includes open and close limit spool valves, but rather than a selector spool valve, a pair of poppet valves are coupled to a shuttle valve. One poppet valve is used to open a pipeline valve, and the other poppet valve is used to close the pipeline valve. For remote operation, a pilot gas is used to open the poppet valves. The poppet valves are operatively coupled to a shuttle valve, which is operatively coupled to the gas turbine motor.

When, for example, a pipeline valve is in a fully-closed position and a pilot gas signal is received by the open poppet valve to open the pipeline valve, then power gas passes though the open poppet valve to the shuttle valve and then through the gas turbine motor. The power gas discharges from the gas turbine motor into the shuttle valve and is discharged into the atmosphere. The pipeline valve continues to move from its fully-closed position towards its fully-opened position until a limit is reached. This gas motor actuator requires a relatively large amount of pipeline gas to open or close a pipeline valve. Further, the limit valve spools have the same problem of cutting O-rings as described above.

A different configuration for a gas-operated valve actuator is described in U.S. Pat. No. 4,380,325 issued to Palmer. High-pressure gas or power gas flows through a three-position selector spool valve. The selector spool valve has an "open" position, a "close" position, and a "neutral" position, which are referred to as "forward," "reverse" and "neutral" positions, respectively, for opening, closing and holding the actuated valve in its current position, respectively. When the selector valve is in the open or forward position, power gas flows through the selector spool valve to a forward poppet limit valve. Provided a limit has not been reached, the power gas flows through the poppet limit valve and into a gas turbine motor. The power gas discharges from the gas turbine motor into and through a close or reverse poppet limit valve and into a shuttle exhaust valve.

The forward poppet limit valve is held open against the flow pressure of the power gas by a tripping mechanism. When a limit is reached, indicating the pipeline valve is in a fully-opened position, the tripping mechanism is tripped, allowing the forward poppet valve to close due to the flow pressure of the power gas. This stops the flow of power gas to the gas turbine motor when a limit is reached. To close pipeline valve, the selector spool valve is placed in the close or reverse position, and the gas flows in a direction that is opposite that described above for opening the pipeline valve. The selector spool valve also has O-rings that pass over ports, which causes deterioration of the O-ring seals in the selector spool valve as described above.

SUMMARY OF THE INVENTION

A gas motor actuator, a control system for a gas turbine motor used in a gas motor actuator, a control-limit valve assembly used in the control system, and a shuttle valve assembly used in the control system can each be implemented according to the present invention. The gas motor actuator according to the present invention can consume less gas than prior art gas motor actuators, making it more efficient and less polluting. Further, the gas motor actuator according to the present invention generally requires less maintenance and is thus more reliable, particularly because O-rings are not moved past ports.

In the gas motor actuator according to the present invention, a shuttle valve is coupled to a gas turbine motor. A control-limit valve assembly is coupled to the shuttle valve. The control-limit valve assembly has a control portion and a limit portion. When pilot gas is provided to the control portion, power gas flows through the control portion to the shuttle valve. The power gas flows through the shuttle valve into the gas turbine motor, where the pressure of the power gas is transformed to rotational mechanical energy that can be used to open or close a valve, an actuated valve, such as a valve on a pipeline, a refinery fluid flow line or any suitable application.

Spent gas discharges from the gas turbine motor into the shuttle valve, where it is exhausted to the atmosphere. When the actuated valve reaches a limit in its travel because it is fully opened or fully closed, the limit is detected by the limit portion of the control-limit valve assembly, which then blocks the flow of power gas through the control portion of the control-limit valve assembly. Thus, the actuated valve is moved into a fully-opened or fully-closed position. A gas motor actuator according to the present invention further includes a second control-limit valve assembly, one control-limit valve assembly for closing the actuated valve and one for opening the actuated valve. Local and remote controls for the pilot gas are further included.

In one embodiment the control portion of the control-limit valve assembly includes a poppet valve assembly and a piston assembly. Pilot gas acts on the piston assembly to open the poppet valve assembly, which allows power gas to flow through the control portion. Power gas continues to flow through the control portion until a limit detection assembly detects that the actuated valve has traveled to a limit, and the detection of the limit causes the limit detection assembly to close the poppet valve assembly. When the poppet valve assembly is closed, power gas flow stops; the rotation of the gas turbine motor stops without power gas flow; and the actuated valve stops traveling.

In one embodiment the limit detection assembly includes a gear system coupled to a shaft in the gas turbine motor. Limit cams are coupled to the gearing system and travel linearly as the gas turbine motor rotates. The limit cams are set to indicate when the actuated valve is in a fully-opened or a fully-closed position. The limit detection system includes a plunger that is engaged by one of the limit cams, where the plunger moves when engaged by the limit cam. When the plunger moves, it closes the poppet valve assembly, which blocks the flow of power gas through the control portion of the control-limit valve assembly.

In one embodiment the shuttle valve assembly includes a shuttle block having a shuttle rod bore and opposing piston head bores. A shuttle rod is received in the shuttle rod bore and a piston head is received on each end of the shuttle rod. The shuttle block includes a plurality of spent gas flow passages parallel to and radial from the shuttle rod bore. An end cap is received on each end of the shuttle block, and each end cap has a power gas inlet port. One power gas inlet port is used for closing the actuated valve, and the other power gas inlet port is used for opening the actuated valve.

Each end cap and piston bore define a piston chamber, and each piston chamber has a port for communication of power gas to the gas turbine motor. This port is also used for receiving spent gas from the gas turbine motor. Power gas flows into the inlet port through the end cap, closing the piston head in that piston chamber, which seals the spent gas flow passages from communication with that piston chamber. The power gas flows through the port and shuttle block into the gas turbine motor. Spent gas is received from the gas turbine motor into the opposing piston chamber, and the spent gas flows through the spent gas passages to a discharge port. The travel of the actuated valve is reversed by feeding power gas to the opposite piston chamber. The flow of the power gas and spent gas through the gas turbine motor and the shuttle valve is reversed, which reverses the travel direction of the actuated valve.

BRIEF DESCRIPTION OF THE DRAWINGS

The invention is more fully described below with reference to the accompanying drawings, in which:

FIG. 6 is an elevation in cross-section of a shuttle valve assembly according to the present invention;

FIG. 7 is an end view of the shuttle block of FIG. 6;

FIG. 8 is a bottom view of the shuttle block of FIG. 6;

DETAILED DESCRIPTION OF INVENTION

Figure 1:
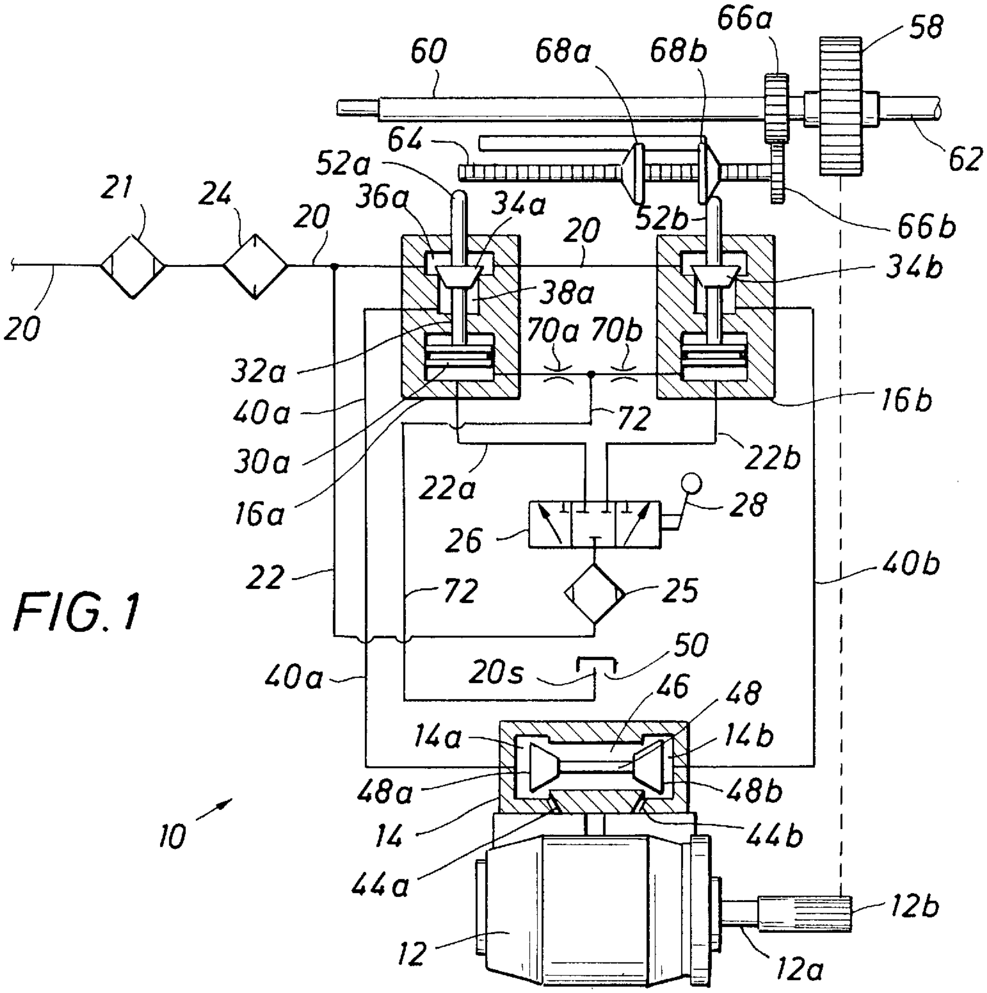
FIG. 1 is a simplified schematic diagram of a gas motor actuator according to the present invention.

FIG. 1 provides a conceptual overview of a gas motor actuator 10 according to the present invention. Gas motor actuator 10 includes a gas turbine motor 12, a shuttle valve 14 coupled to gas turbine motor 12, and a pair of control-limit valve assemblies 16*a* and 16*b* coupled to shuttle valve 14. Control-limit valve assembly 16*a* is used to run gas turbine motor 12 in a direction to close an actuated valve (not shown) to which actuator 10 would be coupled. Control-limit valve assembly 16*b* is used to run gas turbine motor 12 in an opposite direction in order to open the actuated valve (not shown). A valve to which actuator 10 may be coupled can be a pipeline valve, a refinery valve, or any other valve for which gas motor actuator 10 would be suitable, and such a valve is referred to here as an actuated valve.

Power gas 20 provides the driving force for rotating gas turbine motor 12. Power gas 20 can be supplied from a storage tank or from any suitable source, but is typically drawn from gas in the line in which the actuated valve is situated. For example, where the actuated valve is a gas pipeline valve, gas from the pipeline can be used as the power gas. The pressure of the power gas varies over a wide range, depending on the application, but typically ranges between 100 psig and 2,500 psig.

A filter 21 is used to remove particulate matter from power gas 20, and a lubricator 24 is used to lubricate power gas 20. Power gas 20, now filtered and lubricated, is supplied to control-limit valve assemblies 16*a* and 16*b*.

Control-limit valve assemblies 16*a* and 16*b* are normally closed when the actuated valve is in its fully-opened or fully-closed position. The actuated valve is a shut-off valve, not a control valve, so the actuated valve is maintained in a fully-opened or fully-closed position. Gas motor actuator 10 is used to open or close the actuated valve.

Pilot gas 22 is withdrawn from power gas 20. A filter 25 further cleans pilot gas 22. A three-position local manual control valve 26 receives pilot gas 22. Local manual control valve 26 has an "open" position, a "close" position and a "neutral" position. The "open" position allows pilot gas 22 to flow through local manual control valve 26 to control-limit assembly 16*b* through line 22*b* for opening the actuated valve. The "close" position of local manual control valve 26 allows pilot gas 22 to flow through valve 26 to control-limit valve assembly 16*a* through line 22*a* for closing the actuated valve. The "neutral" position blocks the flow of pilot gas through local manual control valve 26.

Gas motor actuator 10 operates as follows, assuming the actuated valve is fully opened, and it is desired to close the actuated valve. Local manual control valve 26 has a position selector 28, and one selects the "close" position to cause gas motor actuator 10 to close the actuated valve. Pilot gas 22 flows through local manual control valve 26 into pilot gas line 22*a*. Local manual control valve 26 blocks the flow of pilot gas 22 into pilot gas line 22*b*. Pilot gas flows through pilot gas line 22*a* into control-limit valve assembly 16*a*. A piston 30*a* is moved by pilot gas 22 flowing through line 22*a*. Piston 30*a* is connected to a push rod 32*a*, and push rod 32*a* is connected to a poppet valve 34*a*. Control-limit valve assembly 16*a* has a chamber 36*a* and a chamber 38*a*, and poppet valve 34*a* provides a seal between chamber 36*a* and chamber 38*a*.

Power gas 20 is received in chamber 36*a*. When pilot gas 22 moves piston 30*a*, poppet valve 34*a* is unseated, allowing power gas 20 to flow from chamber 36*a* into chamber 38*a*. A line 40*a* provides a flow path for power gas 20 from chamber 38*a* to shuttle valve 14. As pilot gas 22 displaces piston 30*a*, power gas 20 flows through chamber 36*a*, chamber 38*a* and into line 40*a* for delivery to shuttle valve 14.

Shuttle valve 14 has chambers 14*a* and 14*b*. Shuttle valve 14 has ports, 44*a* and 44*b*, which provide flow paths between chambers 14*a* and 14*b* and gas turbine motor 12, respectively. Shuttle valve 14 has a central bore 46 between chambers 14*a* and 14*b*. A piston rod 48 is received in central bore 46, and piston rod 48 has piston heads 48*a* and 48*b*. Piston head 48*a* provides a seal between chamber 14*a* and bore 46, and piston head 48*b* provides a seal between chamber 14*b* and bore 46.

As power gas 20 flows through line 40*a* into chamber 14*a*, piston head 48*a* provides a seal between chamber 14*a* and bore 46. Power gas 20 flows from chamber 14*a* through port 44*a* into gas turbine motor 12, causing gas turbine motor 12 to rotate. As power gas 20 flows through gas turbine motor 12, its pressure-based energy is spent and transferred into rotational energy of gas turbine motor 12. Thus, as higher-pressure power gas 20 flows through gas turbine 12, it drops in pressure and transforms into a lower-pressure spent gas 20*s*, which is discharged through port 44*b* into chamber 14*b* of shuttle valve 14. While piston head 48*a* provides a seal between chamber 14*a* and bore 46, piston head 48*b* is pushed away from bore 46 providing a flow path between chamber 14*b* and bore 46.

Shuttle valve 14 has an exhaust outlet 50 that provides a flow path for spent gas 20*s* from bore 46 to the atmosphere. Power gas 20 continues to flow through gas turbine motor 12 and discharge as spent gas 20*s* through exhaust outlet 50 as the actuated valve moves from its open position towards a closed position.

When the actuated valve reaches its fully-closed position, poppet valve 34*a* is closed to shut off flow of power gas 20 through control-limit valve assembly 16*a*. Control-limit valve assembly 16*a* has a limit detector 52*a* coupled to poppet valve 34*a* for closing poppet valve 34*a* when the actuated valve reaches its fully-closed position.

An indication that the actuated valve has reached its fully-closed position is provided as follows. Gas turbine motor 12 has an output shaft 12*a* on which is placed a pinion gear 12*b*, and pinion gear 12*b* is engaged with a spur gear 58. Spur gear 58 is received on a wrench shaft 60, which is coupled to a valve shaft 62 on the actuated valve (not shown). A threaded cam shaft 64 is rotationally coupled to wrench shaft 60 through cam gears 66*a* and 66*b*. Limit cams 68*a* and 68*b* are treadedly engaged on cam shaft 64.

Limit cams 68*a* and 68*b* are pre-set during installation of gas motor actuator 10 to indicate when the actuated valve is fully closed or fully opened, respectively. As gas turbine motor 12 rotates, it rotates valve shaft 62, which moves the actuated valve from its open position towards its closed position. Through gears 12*b*, 58, 66*a* and 66*b*, limit cams 68*a* and 68*b* move linearly along cam shaft 64. When the actuated valve reaches its fully-closed position, limit cam 68*a* contacts limit detector 52*a* of control-limit valve assembly 16*a*, closing poppet valve 34*a*. Thus, limit cam 68*a* provides a signal or indication that the actuated valve has reached its fully-closed position.

The flow of power gas 20 through control-limit valve assembly 16*a* is thus blocked when limit cam 68*a* contacts limit detector 52*a*, causing poppet valve 34*a* to close. Without flow of power gas through line 40*a* into shuttle valve 14, the rotation of gas turbine motor 12 stops. Consequently, the rotation of valve shaft 62 stops, and the movement or travel of the actuated valve towards its fully-closed position stops when the actuated valve reaches its fully-closed position.

Local manual control valve 26 would be manually returned to its neutral position and gas motor actuator 10 resets so that it is ready to re-open the actuated valve. Orifices 70*a* and 70*b*, which may be about 1/32nd of an inch, are used to bleed pilot gas 22 off of control-limit valve assemblies 16*a* and 16*b*, respectively. A line 72 provides a flow path from orifices 70*a* and 70*b* to exhaust outlet 50 for discharge into the atmosphere. Gas motor actuator 10 is thus in a reset position for activation to move the actuated valve back into its open position.

To re-open the actuated valve, position selector 28 is used to switch local manual control valve 26 into its open position. Pilot gas 22 flows through valve 26 into line 22*b* into control-limit valve assembly 16*b*. Pilot gas 22 moves piston 30*b*, which opens poppet valve 34*b*. With poppet valve 34*b* open, power gas 20 flows through control-limit valve assembly 16*b* into line 40*b*. Power gas 20 flows through line 40*b* into shuttle valve 14, shifting piston rod 48 so that piston head 48*b* provides a seal between chamber 14*b* and bore 46. The power gas flows into port 44*b*, causing gas turbine motor 12 to rotate in a direction opposite that in which it rotated when the power gas was flowing into gas turbine motor 12 through port 44*a*.

Again, the pressure-based energy in the power gas is employed to rotate gas turbine motor 12. Spent gas 20*s* from gas turbine motor 12 is discharged through port 44*a* into chamber 14*a*. Since piston rod 48 has shifted, a flow path is provided between chamber 14*a* and bore 46, and spent gas 20*s* discharges through exhaust outlet 50. As power gas flows into gas turbine motor 12 through port 44*b*, and spent gas discharges through port 44*a*, output shaft 12*a* is rotated in a direction so that valve shaft 62 re-opens the actuated valve.

As the actuated valve is re-opened, limit cams 68*a* and 68*b* travel linearly along cam shaft 64. When the actuated valve reaches its fully-opened position, limit cam 68*b* contacts limit detector 52*b*, which closes poppet valve 34*b*. When poppet valve 34*b* is closed, the flow of power gas through control-limit valve assembly 16*b* is blocked. Consequently, power gas cannot flow through line 40*b* into gas turbine motor 12, and thus the rotation of gas turbine motor 12 is stopped. The actuated valve is thus re-opened. Local manual control valve 26 is moved into its neutral position. Pilot gas is bled off through orifice 70*b* to exhaust outlet 50 through line 72, and thus gas motor actuator 10 is reset for subsequent closing of the actuated valve.

Figure 2:
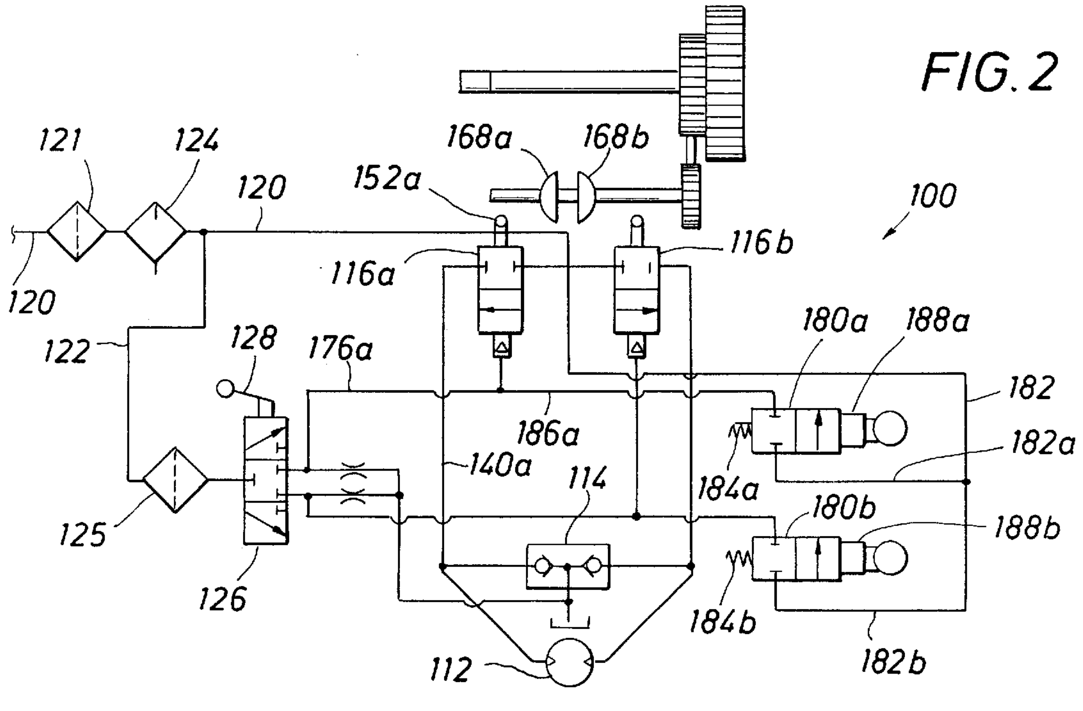
FIG. 2 is a schematic diagram of a gas motor actuator according to the present invention.

With reference to FIG. 2, a gas motor actuator 100 is illustrated schematically. Gas motor actuator 100 includes a gas turbine motor 112, a shuttle valve 114 coupled to gas turbine motor 112, and control-limit valve assemblies 116*a* and 116*b* for closing and opening an actuated valve, such as an actuated valve. Gas motor actuator 100 has the same basic components as gas motor actuator 10, and where the components are similar, the element numbers differ by 100.

Power gas 120 is passed through a filter 121 and a lubricator 124. A pilot gas 122 is supplied by the filtered and lubricated power gas 120, and a filter 125 further removes particulate matter from the gas stream. A three-position local manual control valve 126 is provided for on-site operation of gas motor actuator 100. Local manual control valve 126 has three positions: open, neutral and close. A position selector 128 provides for selection between the three positions. When the "close" position is selected, pilot gas 122 flows through local manual control valve 126 into line 176*a*, which is somewhat different from line 22*a* in FIG. 1.

When pilot gas 122 flows through line 176*a* to control-limit valve assembly 116*a*, power gas 120 flows through control-limit valve assembly 116*a* into line 140*a*. Line 140*a* provides a flow path for power gas into shuttle valve 114. Shuttle valve 114 is coupled to gas turbine motor 112 like shuttle valve 14 in FIG. 1 is coupled to gas turbine motor 12.

Gas motor actuator 100 differs from gas motor actuator 10 primarily in that gas motor actuator 100 can be operated from a remote location. Solenoid valves 180*a* and 180*b* are used to control the flow of pilot gas to control-limit valve assemblies 116*a* and 116*b*. A pilot gas line 182 is tapped into power gas 120. Pilot gas line 182 splits into pilot gas lines 182*a* and 182*b* for providing pilot gas to solenoid valves 180*a* and 180*b*, respectively. Solenoid valves 180*a* and 180*b* have wires 184*a* and 184*b*, respectively, for receiving a control signal to activate the solenoid valves. Wires 184*a* and 184*b* lead to a control center located remotely from gas motor actuator 100.

When an operator desires to close an actuated valve actuated by gas motor actuator 100, the operator sends a signal through wire 184*a*. The signal allows pilot gas to flow through line 182*a* into line 186*a*. Flowing through line 186*a* into control-limit valve assembly 116*a*, the pilot gas allows power gas to flow through control-limit valve assembly 116*a* into line 140*a* for flow through gas turbine motor 112. Gas turbine motor 112 continues to rotate until limit cam 168*a* contacts limit detector 152*a*.

Thus, power gas flow is blocked in gas motor actuator 100 as it was blocked for gas motor actuator 10 of FIG. 1. Proximity switches 188*a* and 188*b* are coupled to solenoid valves 180*a* and 180*b*, respectively. As limit cam 168*a* engages limit detector 152*a*, proximity switch 188*a* detects the fact that limit detector 152*a* has caused the blockage of power gas flow through control-limit valve assembly 116*a*. Proximity switch 188*a* then sends a signal to solenoid valve 180*a* to reset solenoid valve 180*a* so that solenoid valve 180*a* is reset for subsequent use.

Similarly, limit cam 168*b* blocks flow through control-limit valve assembly 116*b* when the actuated valve reaches a fully-opened position. When cam limit 168*a* engages limit detector 152*b*, proximity switch 188*b* detects this and sends a signal to solenoid valve to 180*b*, which resets solenoid valve 180*b*. With this reset, solenoid valve 180*b* is thus reset and ready for subsequent use.

Thus, with the addition of solenoid valves and proximity switches, the gas motor actuator of the present invention can be activated from a remote location. Thus, for example, valves in an actuated or in a refinery or the like can be operated from a control center that is located remote from the gas motor actuator. Alternatively, an operator can use the local manual control valve to open or close the actuated valve when the operator is on-site with the gas motor actuator.

Figure 3:
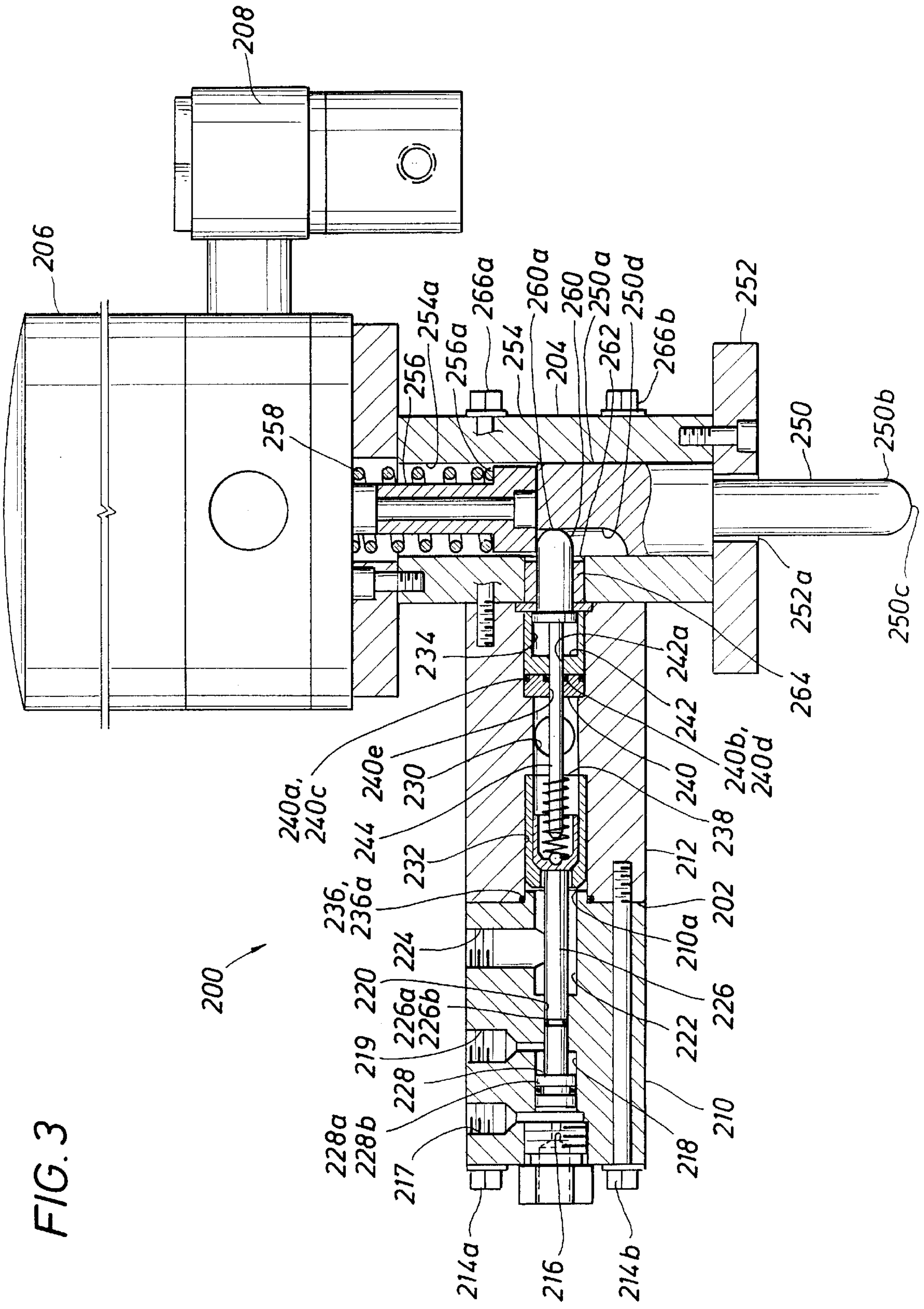
FIG. 3 is an elevation in partial cross-section of a control-limit valve assembly according to the present invention.

With reference to FIG. 3, a control-limit valve assembly 200 is shown in partial cross-section, which is a specific embodiment of control-limit valve assemblies 16*a*, 16*b*, 116*a* and 116*b*, including a solenoid and proximity switch as described below. Control-limit valve assembly 200 has a pilot gas-activated control valve portion 202, a limit valve portion 204 coupled to control valve portion 202, a proximity switch 206 secured to limit valve portion 204, and a solenoid valve 208 coupled to proximity switch 206. Proximity switch 206 and solenoid valve 208 typically would not be used if only a local manual control valve were used, such as illustrated in FIG. 1. If proximity switch 206 were not used, a cap would instead be bolted to limit portion 204.

Control portion 202 includes a pilot block 210 and a power block 212. Bolts 214*a* and 214*b* secure pilot block 210 to power block 212. Pilot block 210 has a pilot gas bore 216, a piston head bore 218, a piston rod bore 220, a power gas intake bore 222 and a power gas discharge bore 224. A piston rod 226 is received in piston rod bore 220, and piston rod 226 has a groove 226*a*. An O-ring 226*b* is received in groove 226*a* for sealing piston rod 226 in piston rod bore 220.

A piston head 228 is secured to piston rod 226 and received in piston head bore 218. Piston head 228 has a groove 228*a*, and an O-ring 228*b* is received in groove 228*a* for sealing piston rod head 228 in piston head bore 218. Pilot gas is received in pilot gas bore 216, where the pilot gas acts on piston head 228. Piston rod 226 slides through piston rod bore 220 when pilot gas acts on piston head 228.

Power block 212 has a power gas inlet port 230, a poppet valve bore 232, a spacer bore 234 and an O-ring seat 236. An O-ring 236*a* is received in seat 236 for providing a seal between pilot block 210 and power block 212. A poppet valve assembly 238 is received in poppet valve bore 232. Pilot block 210 has a shoulder 210*a* that extends into poppet bore 232 for securing poppet valve assembly 238 within poppet valve bore 232.

A sealing spacer 240 is received in spacer bore 234, and sealing spacer 240 has O-ring grooves 240*a* and 240*b*. O-rings 240*c* and 240*d* are received in grooves 240*a* and 240*b*, respectively. A cup-shaped spacer 242 is received in spacer bore 234 and sealed against sealing spacer 240. Spacers 240 and 242 have push rod bores 240*e* and 242*a*, respectively. A push rod 244 is received in push rod bores 240*e* and 242*a*.

Figure 4:
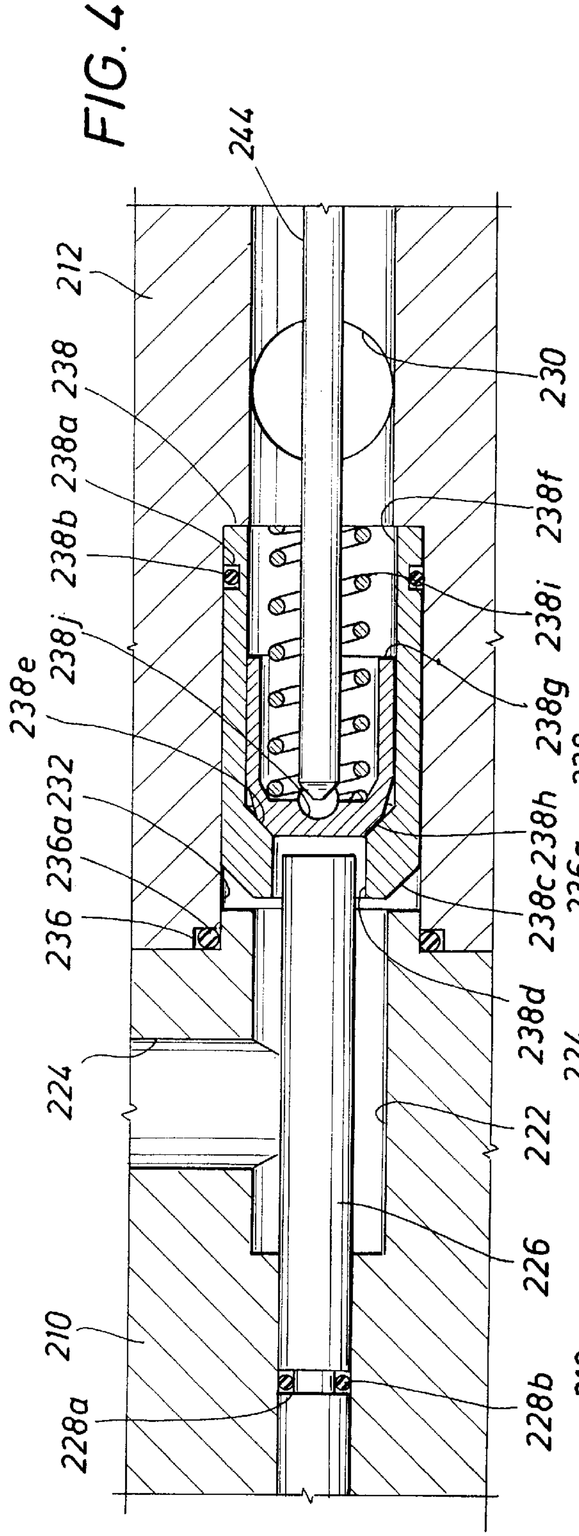
FIG. 4 is an enlarged view of the poppet valve assembly in FIG. 3, showing the poppet valve assembly in a closed position.
Figure 5:
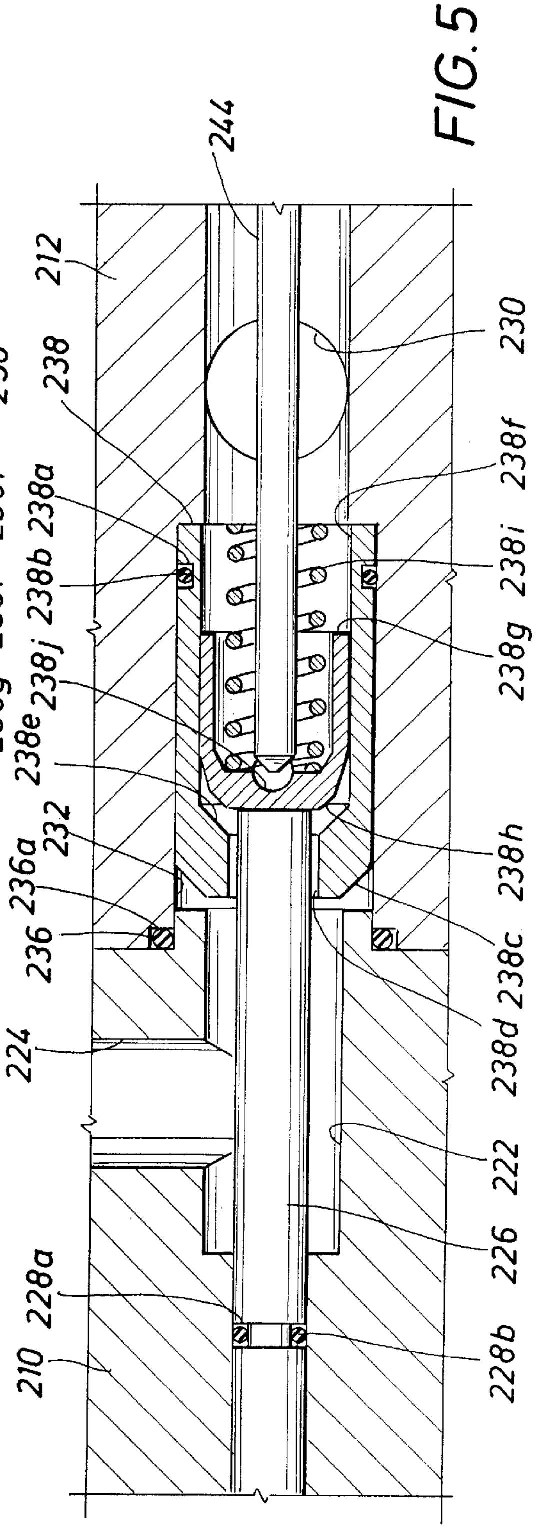
FIG. 5 is an enlarged view of the poppet valve assembly in FIG. 3, showing the poppet valve assembly in a open position.

With reference to FIGS. 4 and 5, an enlargement of poppet valve assembly 238 is shown in a closed and an open position, respectively. Poppet valve assembly 238 has a groove 238*a* that receives an O-ring 238*b* for sealing poppet valve assembly 238 within poppet valve bore 232. Poppet valve assembly 238 has a larger open-bottom cup 238*c*. Cup 238*c* has an opening 238*d*, a seating surface 238*e* and a bore 238*f*. A smaller solid-bottom cup 238*g* is received in bore 238*f*. Cup 238*g* has a sealing surface 238*h* that matingly engages sealing surface 238*e* of larger cup 238*c*, providing a seal between cups 238*c* and 238*g*. A spring 238*i* engages smaller cup 238*g*, keeping poppet valve assembly 238 normally closed with sealing surfaces 238*e* and 238*h* normally engaged.

A gray shaded region in FIGS. 4 and 5 indicates the location of power gas in pilot block 210 and power block 212. In FIG. 4 poppet valve assembly 238 is closed, and power gas entering port 230 is blocked at the seal formed by surfaces 238*e* and 238*h*. With reference to FIGS. 3–5, when pilot gas acts on piston head 228, piston rod 226 is pushed against smaller cup 238*g*, which forms an open passageway between sealing surfaces 238*e* and 238*h*. As long as pilot gas acts on piston head 228, piston rod 226 holds poppet valve assembly 238 in an open position so that power gas flows through ports 238*j* in smaller cup 238*g*, through bore 238*d* and out power gas outlet 224. Power gas continues to flow from inlet port 230 through poppet valve assembly 238 and out through power gas outlet 224 until poppet valve assembly 238 is closed.

With reference to FIG. 3, poppet valve assembly 238 remains open until limit valve portion 204 detects that a limit has been reached. As discussed in reference to FIGS. 1 and 2, a limit is detected when the actuated or pipeline valve reaches a fully-opened or a fully-closed position. As was discussed with reference to FIGS. 1 and 2, a limit cam provides an indication when a limit has been reached.

A plunger 250 serves as a limit detector in this embodiment for receiving the indication that the actuated valve has reached a fully-opened or a fully-closed position (FIG. 3). Plunger 250 has a main body 250*a* and a stem 250*b* that extends outwardly from a plate 252. Stem 250*b* has a rounded end 250*c*.

Limit valve portion 204 has a limit block 254 and limit block 254 has a bore 254*a* located centrally through the length of limit block 254. Main body 250*a* of plunger 250 is received in bore 254*a*. A shaft 256 having a shoulder 256*a* is received in bore 254*a*. A spring 258 surrounds shaft 256 and engages shoulder 256*a*, forcing shaft 256 to butt against main body 250*a* of plunger 250. Thus, spring 258 forces stem 250*b* to extend through a bore 252*a* in plate 252.

A push pin 260 is engaged in cup-shaped spacer 242 and extends from power block 212 (FIG. 3). Limit block 254 has a push pin port 262 for receiving push pin 260. A bearing 264 is received in push pin port 262 so that push pin 260 will slide easily in and out of push pin port 262. Main body 250*a* of plunger 250 has a notch 250*d*, and push pin 260 has an outer end 260a that engages notch 250*d*. Bolts 266*a* and 266*b* fasten limit block 254 to power block 212.

When a limit is reached because the actuated valve has reached a fully-opened or fully-closed position, a limit cam gear engages end 250*c* of plunger 250, which causes plunger 250 to move inwardly through bore 254*a* in limit block 254. As plunger 250 moves inwardly, end 260*a* of push pin 260 rides along a ramped surface of main body 250*a* that defines notch 250*d*. Consequently, when plunger 250 is pushed inwardly into bore 254*a* by a cam gear, push pin 260 is pushed into power block 112. When push pin 260 is pushed into power block 212, push rod 244 is engaged and pushed by push pin 260 (FIG. 3).

Consequently, as a cam gear engages end 250*c* of plunger 250, push pin 260 pushes push rod 244, which causes poppet valve assembly 238 to close (FIGS. 3 and 5). This stops the flow of power gas through power block 212. When push pin 260 pushes push rod 244, sealing surface 238*h* engages sealing surface 238*e* in poppet valve assembly 238, which blocks the flow of power gas through poppet valve assembly 238. When power gas flow is blocked, the gas turbine motor no longer rotates, and the gas motor actuator ceases to open or close the actuated valve.

Proximity switch 206 detects movement of shaft 256 and provides an indication when the actuated valve has reached a limit of fully opened or fully closed. This indication is provided to pilot solenoid valve 208, where it can be used to reset solenoid valve 208 (FIG. 3). Solenoid valve 208 is used in the manner described for solenoid valves 180*a* and 180*b* in FIG. 2.

Poppet valve assembly 238 in FIGS. 3–5 works best if there is a proper balance of forces. Piston 228 has a face area in contact with pilot gas, and the force generated by the pilot gas is proportional to the pressure of the pilot gas times the face area of the piston. When poppet valve assembly 238 is in its normally closed position, push rod 244 is backed off, and spring 238*i* and power gas hold smaller cup 238*g* in sealing engagement with larger cup 238*c* (FIG. 4). The force holding poppet valve assembly 238 normally closed is less than the force applied by pilot gas on piston head 228 so that pilot gas opens poppet valve assembly 238. As power gas flows through poppet valve assembly 238, there is a balance of forces on smaller cup 238*g*. Reseat force, which is the amount of force required for push rod 244 to exert on smaller cup 238*g* to close poppet valve assembly 238, is preferably minimized to minimize the amount of force that must be applied on push pin 260 by plunger 250 when a cam gear engages end 250*c* of plunger 250 (FIG. 3).

Control-limit valve assembly 200 in FIG. 3 can be made by machining anodized aluminum, although other suitable methods and materials are available. For example, 2½-inch square stock can be used. The pilot port can receive a ¼ in. NPT pilot in a ¾-16 hexplug. Power gas inlet port 230 and outlet discharge 224 can be ¼ in. NPT. Pilot block 210 further has a remote supply port 217, which can receive a ⅛ in. NPT. Pilot block 210 further has a vent port 219, which can receive a ⅛ in. NPT for venting pilot gas trapped in piston head bore 218. A cartridge valve insert, partially made of stainless steel, can be used for poppet valve assembly 238. Kepner Products Company of Villa Park, Ill. provides a cartridge lock valve insert suitable for use as poppet valve assembly 238. Plunger 250 can be made of nylon, stainless steel, carbon steel, or it can be a carbon steel coated with a low-friction plastic material, for example. Friction in the movement of push pin 260 is preferably minimal.

Turning now to FIG. 6, a shuttle valve 300 is shown in cross-sectional elevation. Shuttle valve 300 is a specific embodiment of shuttle valve 14 (FIG. 1) and shuttle valve 114 (FIG. 2). Shuttle valve 300 includes a shuttle block 302 and end caps 304*a* and 304*b* fastened to opposing ends 302*a* and 302*b* of shuttle block 302, respectively. Bolts 306*a, b, c* and *d* fasten end caps 304 and 304*b* to shuttle block 302.

Shuttle block 302 has a shuttle rod bore 308 centralized throughout its length. Shuttle block 302 has piston head bores 310*a* and 310*b* and intermediate bores 312*a* and 312*b*. Shuttle block 302 has gas motor ports 314*a* and 314*b* around which is provided seats 316*a* and 316*b*, respectively, in which are received O-rings 318*a* and 318*b*, respectively. Gas motor ports 314*a* and 314*b* provide a fluid path between a gas turbine motor (not shown) and piston head bores 310*a* and 310*b*, respectively. End caps 304*a* and 304*b* have power gas ports 320*a* and 320*b*, respectively, for receiving power gas from a control-limit valve assembly. Power gas flows into piston head bores 310*a* and 310*b* through power gas ports 320*a* and 320*b*, respectively, but only through one or the other, depending on whether the actuated valve is being opened or closed.

FIG. 7 provides an end view of shuttle block 302 with end plate 304*b*, shuttle rod 330 and piston head 342*b* removed. Seat 309 provides a recess for receiving an O-ring 309*a*, which provides a seal between end cap 304*b* and shuttle block 302. Bolt holes 306*c*' and 306*c*" receive bolts 306*c* for fastening end cap 304*b* to shuttle block 302. Likewise, holes 306*d*' and 306*d*" receive bolts 306*d*. From this end view, it is apparent that six spent gas flow passages 326 are formed around shuttle rod port 308.

FIG. 8 is a bottom view of shuttle block 302 without end caps 304*a* and 304*b*. Ports 314*a* and 314*b* provide a flow path for power gas into the gas turbine motor. Bolt holes 315 provide passages for receiving bolts for attaching shuttle block 302 to the gas turbine motor.

Shuttle block 302 has a spent gas discharge port 322 for exhausting gas from the gas turbine motor. Shuttle block 302 has a vent inlet port 324 for receiving vented pilot gas, such as from orifices 70*a* and 70*b* in FIG. 1 and from vent discharge port 219 in FIG. 3, the pilot gas being discharged through discharge port 322. Shuttle block 302 has six spent gas flow passages 326 (FIG. 7). Spent gas flow passages 326 provide flow paths for the discharge of spent gas from the gas turbine motor to discharge port 322.

A shuttle rod 330 having shoulders 330*a* and 330*b* and threaded ends 330*c* and 330*d* is received in shuttle rod bore 308. Piston washers 332*a* and 332*b* are received against shoulders 330*a* and 330*b*, respectively. Piston cups 334*a* and 334*b* encompass piston washers 332*a* and 332*b*, respectively. Piston cups 334*a* and 334*b* have tapered recesses 336*a* and 336*b* for holding O-rings 338*a* and 338*b*, respectively. Nuts 340*a* and 340*b* fasten piston cups 334*a, b* and 332*a, b* against shoulders 330*a*, b, respectively. Piston head bores 310*a* and 310*b* have sealing surfaces 310*c* and 31*d*, and O-rings 338*a* and 338*b* seal against sealing surfaces 310*c* and 310*d*, respectively. These various components cooperate to form piston heads 342*a* and 342*b*. By receiving shuttle rod 330 in shuttle rod bore 308, shuttle valve 300 operates more reliably than a shuttle valve that has on oversized bore that does not hold the shuttle rod in a centralized position.

Shuttle valve 300 in FIG. 6 operates as follows. Power gas inlet port 320*a* in shuttle valve 300 of FIG. 6 is connected by tubing to power gas discharge port 224 in control-limit valve assembly 200 of FIG. 3. A gas motor actuator according to the present invention requires two control-limit valve assemblies 200 (FIG. 3) and one shuttle valve assembly 300 (FIG. 6). Power gas inlet port 320*b* is connected to a power gas discharge port of a second control-limit valve assembly 200. One control-limit assembly 200 provides power gas for closing an actuated valve by delivering gas through tubing to power gas inlet port 320*a*. A second control-limit valve assembly 200 provides power gas to power gas inlet port 320*b* for opening the actuated valve.

When power gas flows into piston head bore 310*a* through inlet port 320*a*, piston head 342*a* is pushed so that O-ring 338*a* seals against sealing surface 310*c*. Thus, power gas cannot flow through spent gas flow passages 326. Power gas flows through gas motor port 314*a* into the gas turbine motor, such as gas turbine motor 12 in FIG. 1. As the power gas passes through the gas turbine motor, a turbine blade (not shown) is rotated, which develops a rotational output from energy in the power gas. This rotational energy is coupled to an actuated valve for closing the actuated valve. As energy is extracted from the power gas, the power gas becomes a spent or exhaust gas, which is discharged from the gas turbine motor into port 314*b* in shuttle valve assembly 300 (FIG. 6). The spent gas flows through intermediate bore 312*b* into spent gas flow passages 326 and out into the atmosphere through discharge port 322.

A large flow area is provided for discharging spent gas from the gas turbine motor, which makes operation of the gas turbine motor very efficient. The less back pressure that spent gas flow passages 326 present, the greater the pressure drop available within the gas turbine motor, and thus, the greater the amount of energy that can be extracted from the power gas for transformation into rotational energy to open or close the actuated valve. Since there is a plurality of spent gas flow passages 326, a large discharge flow cross-sectional area is presented for discharge of spent gas from the gas turbine motor. Further, port 314*b* and spacing between sealing surface 310*d* and O-ring 338*b* provide a large discharge flow area for discharge of spent gas from the gas turbine motor. Again, this makes the operation of the gas turbine motor more efficient than a gas motor actuator having a lesser discharge flow cross-sectional area, which is typical of prior art gas motor actuators. Consequently, for this and other reasons, the gas motor actuator of the present invention operates more efficiently and with less power gas consumption than do prior art gas motor actuators.

Continuing the discussion on operation of shuttle valve 300 in FIG. 6, to subsequently open the actuated valve, power gas is fed into port 320*b*, closing piston head 342*b*. Power gas flows into the gas turbine motor (not shown in FIG. 6) through port 314*b*. The power gas flows through the gas turbine motor in an opposite direction as to that described immediately above causing an opposite rotational output that opens the actuated valve rather than closing it. The energy in the high-pressure power gas is spent as it rotates the turbine in the gas turbine motor, forming a spent gas that is discharged through port 314*a*. The spent gas flows through piston bore head 310*a*, through intermediate bore 312*a* and then through spent gas flow passages 326 into discharge port 322 for discharge into the atmosphere.

Thus, shuttle valve 300, which is bolted directly to the gas turbine motor, provides an efficient assembly for allowing gas to flow through the gas turbine motor in opposite directions. One direction for rotating the output shaft from the gas turbine motor in a clockwise direction and an opposite direction of gas flow for rotating the output shaft of the gas turbine motor in a counter-clockwise direction.

Figure 9:
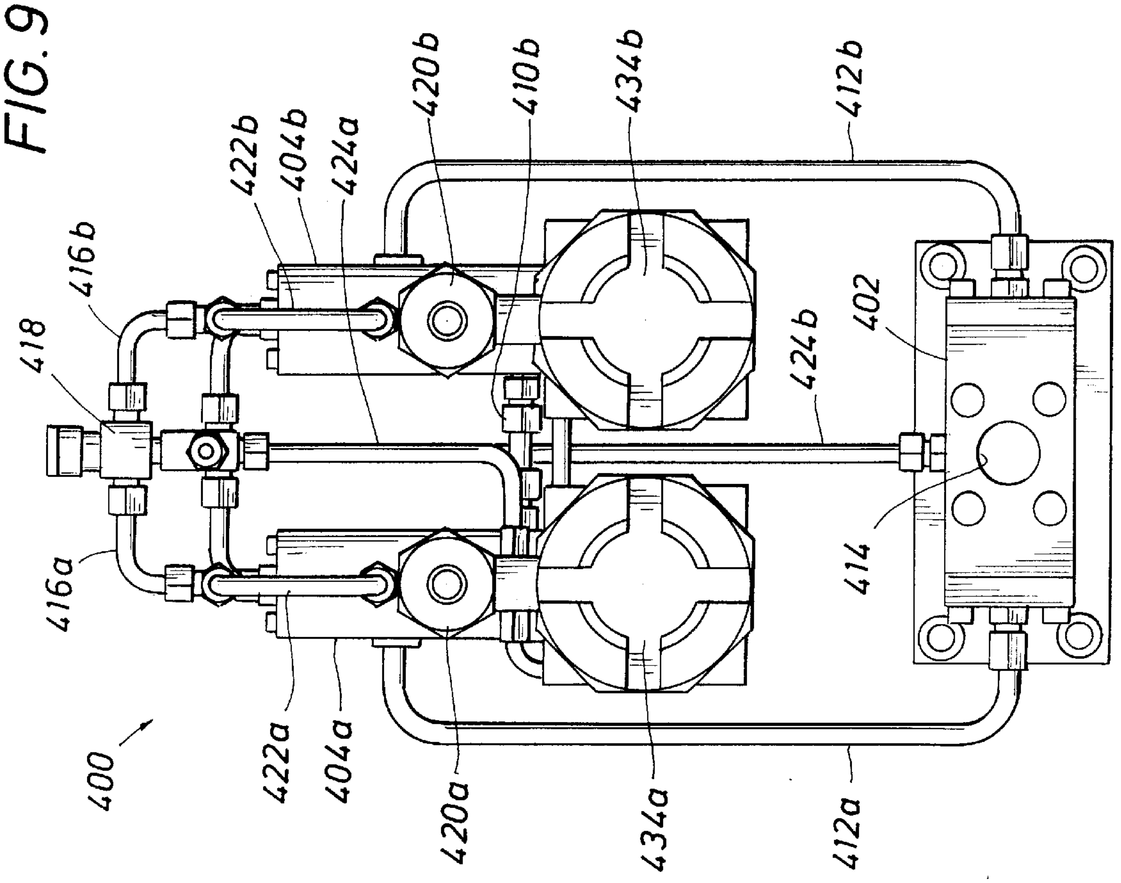
FIG. 9 is a front elevation of a control system for a gas turbine motor according to the present invention.
Figure 10:
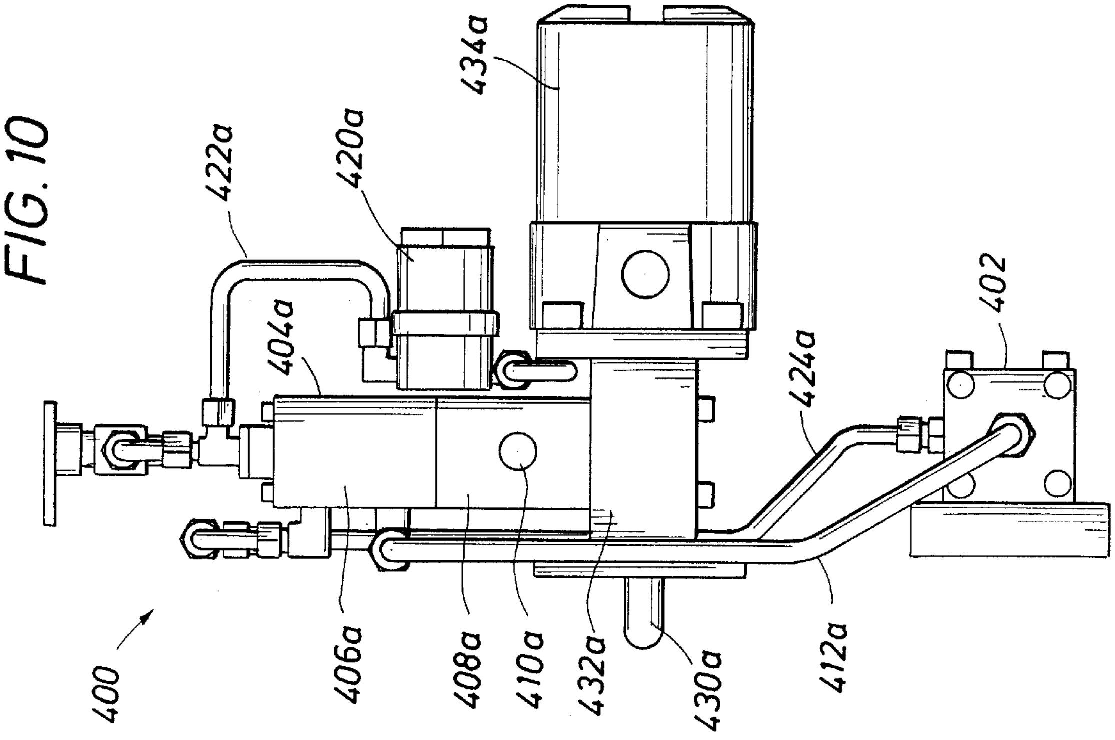
FIG. 10 is a side elevation of the control system of FIG. 9.

Turning now to FIGS. 9 and 10, a front elevation and a side elevation, respectively, is provided for a control system 400, which would be used for delivering power gas to and discharging spent gas from a gas turbine motor, which is not shown. Control system 400 can be used as a retrofit kit to replace the control system for an existing gas turbine motor, and it can be used as part of a new, complete system as well. Control system 400 includes a shuttle valve assembly 402, which would be attached to the gas turbine motor (not shown), a control-limit valve assembly 404*a* for rotating the gas turbine motor in a clockwise direction and a control-limit valve assembly 404*b* for rotating the gas turbine motor in a counter-clockwise direction. These directions are stated arbitrarily, and one direction is for opening an actuated valve, while the other direction is for closing the actuated valve.

Control-limit valve assembly 404*a* (FIG. 10) has a pilot block 406*a* and a power block 408*a*. Power gas is supplied to assembly 404*a* through a port 410*a* and to control-limit valve assembly 404*b* through a line 410*b* (FIG. 9) that is connected to power block 408*a*. Power gas passes through control-limit valve assemblies 404*a* and 404*b* and discharges into tubes 412*a* and 412*b* for delivery to shuttle valve 402. Either assembly 404*a* or 404*b* is open, not both at the same time, so power gas flows through tube 412*a* or tube 412*b*, respectively, not both at the same time. If gas is flowing through tube 412*a*, it flows into shuttle valve 402, through the gas turbine motor, and discharges through shuttle valve 402 through discharge port 414, as described with reference to shuttle valve 300 in FIG. 6.

Pilot gas is used to allow power gas flow through control-limit valve assemblies 404*a* and 404*b*, as explained above with reference to FIG. 3. Pilot gas can be introduced manually to control-limit valve assembly 404*a* through line 416*a* and to control-limit valve assembly 404*b* through line 416*b*. This is accomplished using a local manual control valve 418. Alternatively, a remote signal can be received by solenoid valves 420*a* and 420*b*, which can provide pilot gas to control-limit valve assemblies 404*a* or 404*b* through lines 422*a* or 422*b*, respectively. Solenoid valves 420*a* and 420*b* and the pilot block portion of control-limit valve assemblies 404*a* and 404*b* are vented through lines 424*a* and 424*b* into discharge outlet 414 in shuttle valve 402.

When pilot gas opens the power block portion of the control-limit valve assemblies 404*a* or 404*b*, power gas flows into tube 412*a* or 412*b*, respectively. This flow of power gas rotates the gas turbine motor, which opens or closes the actuated valve, until the actuated valve reaches a limit of fully opened or fully closed. When a limit is reached a limit cam (not shown) on the gas turbine motor contacts plunger 430*a* (FIG. 10). When plunger 430*a* is engaged by the limit cam, indicating the actuated valve has reached a fully-opened or fully-closed position, the plunger 430*a* is pushed into a limit block 432*a*. As described above with reference to FIG. 3, when plunger 430*a* is pushed into limit block 432*a*, power gas flow through power block 408*a* is stopped. Proximity switch 434*a* detects when plunger 430*a* is pushed into limit block 432*a* and sends a signal to solenoid valve 420*a*, resetting solenoid valve 420*a*. The control system 400 is thus reset and ready to reverse the operation.

Figure 11:
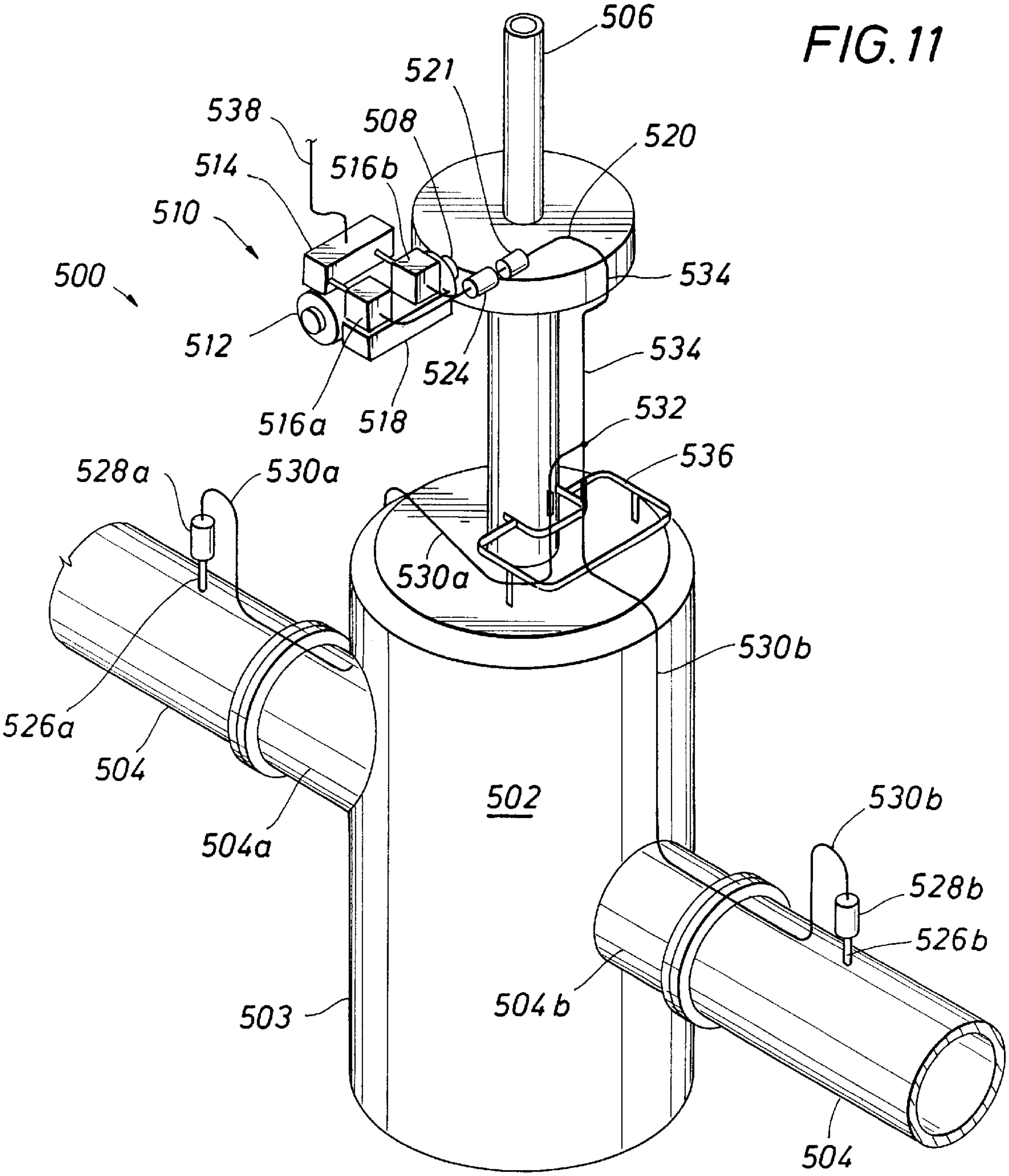
FIG. 11 is a simplified schematic diagram of a typical application for a gas motor actuator according to the present invention.

With reference to FIG. 11, a typical application 500 according to the present invention is illustrated schematically. An actuated valve 502 has a body 503 and is installed in a pipe 504. Actuated valve 502 can be used in a variety of installations, including a steel mill, a pulp and paper mill, a chemical plant, a refinery or in a pipeline. Valve 502 has an inlet bore (not shown) coupled to an inlet section 504*a* of pipe 504, and valve 502 has an outlet bore (not shown) coupled to an outlet section 504*b* of pipe 504. Valve 502 has a valve element (not shown) disposed between the inlet bore and the outlet bore. A valve stem 506 is connected to the valve element.

An output shaft 508 is connected to valve stem 506. Typically, output shaft 508 is coupled to valve stem 506 through a gear assembly (not shown). Valve 502 can be any type of valve, including a gate valve and a rotary valve. For example, valve 502 can be a gate valve, in which case a valve body has a bore through it, and the valve element is a gate that slides in and out of the valve body for opening and closing the valve. The valve stem is connected to the gate for moving the gate into a closed position in the bore in the valve body and into an open position out of the bore in the valve body.

A gas motor actuator 510 is coupled to valve stem 506 through output shaft 508. Gas motor actuator 510 includes a gas turbine motor 512, a shuttle valve 514 attached to gas turbine motor 512, and control-limit valve assemblies 516*a* and 516*b*. A gear box 518 can be opened for adjusting and setting a limit cam (not shown) for control-limit valve assemblies 516*a* and 516*b*.

Power gas 520 is passed through a filter, 521 and a lubricator 524. Pilot gas (not shown) is also supplied by power gas 520. Power gas 520 is supplied by gas flowing through pipe 504, although the power gas can be supplied from an alternative source, such as a self-contained tank. Pipe taps 526*a* and 526*b* provide fluid communication with gas inside pipe inlet 504*a* and pipe outlet 504*b* respectively. Tap valves 528*a* and 528*b* are connected to pipe taps 526*a* and 526*b*, respectively. Pipes 530*a* and 530*b* are connected to tap valves 528*a* and 528*b*, respectively, and are combined at a tee 532 and fed to filter 522 through a pipe 534. A guard rail 536 can be used to protect pipes 530*a* and 530*b* and tee 532.

Thus, power gas 520 can be withdrawn from either pipe inlet 504*a* or pipe outlet 504*b*, depending on the direction of fluid flow in pipe 504. Although, valve 502 has been labeled as having an inlet and an outlet, valve 502 can be bi-directional, allowing gas flow in either direction.

In operation, tap valves 528*a* and 528*b* can be open to supply power gas 520 to filter 522. Filtered and lubricated power gas is fed to control-limit valve assemblies 516*a* and 516*b*, where one control-limit valve assembly is for opening actuated valve 502 and the other is for closing valve 502. An operator at a remote location can send a signal to open or close valve 502, in which case the appropriate control-limit valve assembly allows power gas 520 to flow to shuttle valve 514. Gas flows through shuttle valve 514 into gas turbine motor 512. As gas flows through gas turbine motor 512, turbine blades (not shown) are rotated, and this rotative output is transferred to output shaft 508 for driving valve stem 506 and opening or closing the valve element. Gas flows out of gas turbine motor 512 and into shuttle valve 514 again, where the gas is discharged through an exhaust pipe 538.

Thus, gas in pipe 504 flows into gas turbine motor 512 at a relatively high pressure and flows out of gas turbine motor 512 at a relatively low pressure. Energy is extracted from the gas as it drops in pressure through gas turbine motor 512, and this extracted energy is transferred to valve stem 506 for opening and closing actuated valve 502.

A gas motor actuator according to the present invention is advantageous for several reasons including efficient operation and low maintenance requirements. Less power gas is generally consumed because the gas turbine motor is run more efficiently. Less maintenance is typically required because poppet and shuttle valves require less maintenance than a spool valve with O-rings. Spool valves with O-rings, particularly where the O-rings pass over ports, are known to deteriorate rather rapidly. In the gas motor actuator of the present invention, no O-rings pass over ports. Further, O-rings in the disclosed embodiments are used much more passively, typically providing an enclosed seal or sealing surface.

A gas motor actuator or a control system for a new system or for retrofitting an existing gas turbine motor, according to the present invention, is efficient and reliable. Further, the gas motor actuator of the present invention reduces emissions of gas to the atmosphere and thus reduces pollution because less gas is required to open or close an actuated valve as compared to gas motor actuators of the prior art.

The reduction in emissions and the improvement in efficiency are at least partly due to the arrangement of the components and the low back-pressure on the gas turbine motor. The shuttle valve provides high-volume gas flow with low back-pressure for reduced consumption of power gas. The low back-pressure is at least partly due to the large discharge flow area for spent/exhaust gas. The spent gas flow passageways 326 contribute considerably to the large discharge flow area for spent gas. It has also been found that a gas motor actuator according to the present invention runs much quieter than a prior art gas motor actuator, the noise measured in decibels being considerably lower than was customary in the past.

The foregoing disclosure and description of the invention are illustrative and explanatory thereof, and various changes in the details of the illustrated apparatus and construction and method of operation may be made without departing from the spirit of the invention.

What is claimed is:

1. A gas motor actuator for opening or closing a valve in a pipe, the valve in the pipe having a limit at or between a fully-closed and a fully-opened position, comprising:

a gas-driven motor having an output that can be operatively coupled to the valve in the pipe, the motor having an open port and a close port for receiving power gas for rotating the motor to open or close the valve in the pipe, respectively;

a shuttle valve for delivering the power gas to the motor and for receiving and discharging the power gas from the motor;

a control-limit valve assembly, the control-limit valve assembly having a control valve portion, a limit valve portion and a passageway capable of delivering power gas to the shuttle valve; and a valve disposed in the passageway, the control valve portion being adapted to receive a signal and to open the valve in the passageway upon receipt of the signal, the limit valve portion being adapted to close the valve in the passageway as the valve in the pipe approaches its limit.

2. The actuator of claim 1, wherein the limit valve portion uses mechanical action to close the valve in the passageway.

3. The actuator of claim 2, wherein the adaptation of the control valve portion is a mechanism that responds to a pilot gas.

4. The actuator of claim 3, further comprising a selector valve for directing the flow of the pilot gas to the control-limit valve assembly.

5. The actuator of claim 3, wherein the valve disposed in the passageway is a poppet valve, and wherein the power gas holds the valve in a normally-closed position.

6. The actuator of claim 1, further comprising a second control-limit valve assembly, wherein one control-limit valve assembly is an open control-limit valve assembly and the other control-limit assembly is a close control-limit valve assembly for opening and closing the valve in the pipe, respectively.

7. The actuator of claim 1, wherein the limit valve portion of the control-limit valve assembly has a limit valve plunger, and wherein the motor has a limit cam operatively coupled to the output of the motor and contact of the limit cam with the limit valve plunger closes the valve in the passageway in the control-limit valve assembly.

8. The actuator of claim 1, wherein the control valve portion of the control-limit valve assembly includes a control block, the control block having a bore and a piston received in the bore, the piston having a piston rod and a piston head connected to the piston rod, wherein the control block is adapted for receiving a pilot gas on the piston head for moving the piston.

9. The actuator of claim 8, wherein the valve in the passageway is a poppet valve, and wherein a push rod and the poppet valve are received in the bore of the control block, the poppet valve being located between the piston rod and the push rod so that pilot gas can move the piston head, thereby moving the piston rod, thereby opening the poppet valve, thereby moving the push rod, wherein power gas can flow through the poppet valve in the bore of the control block provided the poppet valve is open.

10. The actuator of claim 9, wherein the limit valve portion of the control-limit valve assembly has a limit block, the limit block being connected to the control block of the control valve portion, the limit block having a bore and a limit valve plunger slidingly received in the bore, the limit valve plunger engaging and pushing the push rod to close the poppet valve.

11. The actuator of claim 1, wherein the shuttle valve comprises:

a shuttle block having a shuttle rod bore, a plurality of passageways approximately parallel to the shuttle rod bore and a pair of opposing piston head bores; and a shuttle rod slidingly received in the shuttle rod bore, the shuttle rod having opposing ends and a piston head received on each end.

12. The actuator of claim 11, wherein the gas turbine motor has an open-valve port and a close-valve port, wherein the shuttle block has opposing ends and an end cap received on each end of the shuttle block, each end cap sealing a respective piston head bore, a shuttle-piston-head chamber being defined within each piston head bore, each end cap having a port for receiving power gas into its respective shuttle-piston-head chamber, the shuttle block having an open-motor port for providing a fluid path for delivering power gas from one shuttle-piston-head chamber to the open-valve port of the motor and a close-motor port for providing a fluid path for delivering power gas from the other shuttle-piston-head chamber to the close-valve port of the motor.

13. The actuator of claim 1, wherein the control valve portion and the limit valve portion are fastened together, the control valve portion comprising:

a block;

a piston rod slidingly received in the block, the piston rod having first and second ends;

a push rod slidingly received in the block, the push rod having first and second ends, the push rod being coaxial with the piston rod; and wherein the valve disposed in the passageway is a poppet valve received in the block between the first end of the piston rod and the first end of the push rod, the block having a power gas inlet port and a power gas discharge port located so that power gas can flow in the power gas inlet port, around the push rod, through the poppet valve and discharge from around the piston rod out through the power gas discharge port, the limit valve portion comprising:

a body having a plunger bore; and a plunger slidingly received in the plunger bore, the plunger having an extension extending from the body, wherein sliding the plunger in the plunger bore causes the push rod to close the poppet valve.

14. The actuator of claim 13, further comprising a piston head connected to the second end of the piston rod, wherein the block has a pilot-gas bore for receiving pilot gas on the piston head for opening the poppet valve.

15. The actuator of claim 14, wherein the push rod and the plunger each have a longitudinal axis and the longitudinal axis of the plunger is transverse to the longitudinal axis of the push rod, further comprising a push pin engaged between the second end of the push rod and the plunger, wherein the plunger has a notch that forms a ramp and the push pin rides on the ramp.

16. The actuator of claim 1, wherein the shuttle valve comprises:

a shuttle block having opposing ends, a piston-head chamber within the shuttle block at each end, a shuttle-rod bore, a gas-motor port providing a fluid flow path through the shuttle block for each piston-head chamber, a discharge port between the piston-head chambers and a flow path between the discharge port and each piston-head chamber;

an end cap attached to each end of the shuttle block, each end cap having an opening;

a shuttle rod slidingly received in the shuttle-rod bore, the shuttle-rod having opposing ends; and a piston head connected to each end of the shuttle rod, wherein the flow path between the discharge port and each piston-head chamber is a plurality of passageways oriented essentially parallel to the shuttle rod and spaced radially around the shuttle rod.

17. A gas motor actuator adapted for opening or closing an actuated valve using a pressurized gas, comprising:

a gas-driven motor for receiving the pressurized gas and developing a rotational output from energy provided by the pressurized gas, wherein the motor can rotate clockwise or counterclockwise, wherein rotation in one direction can be used to open the actuated valve and rotation in the other direction can be used to close the actuated valve;

a shuttle valve operatively coupled to the motor for passing the pressurized gas to the motor and for receiving gas from the motor for discharge as an exhaust gas, the shuttle valve comprising:

a shuttle body having a length, a shuttle-rod bore through the length and opposing ends, the shuttle body having a piston cylinder chamber in each end;

a shuttle rod slidingly received in the shuttle-rod bore, the shuttle rod having opposing ends;

a piston head received on each end of the shuttle rod, the piston heads being located within the piston cylinder chambers of the shuttle body; and an end cap received on each end of the shuttle body, the shuttle body and the end caps having ports for operatively passing pressurized gas and exhaust gas through the shuttle valve;

a control valve operatively coupled to the shuttle valve for supplying pressurized gas to the shuttle valve, the control valve comprising:

a control body having a length and a bore through the length;

a piston rod received in the bore;

a piston head received on one end of the piston rod;

a push rod received in the bore; and a sealing device disposed within the bore between the piston rod and the push rod for blocking the flow of pressurized gas through the bore in the control body; and a limit apparatus operatively coupled to the control valve for shutting off pressurized gas flow through the control valve.

18. The actuator of claim 17, wherein the motor includes a gear that can be preset to indicate when the actuated valve is fully opened or fully closed, wherein the limit apparatus has a detector that pushes on the push rod to close the sealing device in the control valve when the gear indicates the actuated valve is fully opened or fully closed.

19. The actuator of claim 17, wherein the sealing device in the control valve is shaped like a cup having an interior chamber and one end of the push rod is received within the chamber.

20. The actuator of claim 17, wherein the sealing device is a cartridge lock valve insert.

21. A control-limit valve assembly for use in a gas motor actuator, comprising:

a control portion and a limit portion secured to the control portion, the control portion comprising:

a block;

a piston rod slidingly received in the block, the piston rod having first and second ends;

a push rod slidingly received in the block, the push rod having first and second ends, the push rod being coaxial with the piston rod; and wherein the valve disposed in the passageway is a poppet valve received in the block between the first end of the piston rod and the first end of the push rod, the block having a power gas inlet port and a power gas discharge port located so that power gas can flow in the power gas inlet port, around the push rod, through the poppet valve and discharge from around the piston rod out through the power gas discharge port, and the limit portion comprising:

a body having a plunger bore; and a plunger slidingly received in the plunger bore, the plunger having an extension extending from the body, wherein sliding the plunger in the plunger bore causes the push rod to close the poppet valve.

22. The control-limit valve assembly of claim 21, further comprising a piston head connected to the second end of the piston rod, wherein the block has a pilot-gas bore for receiving pilot gas on the piston head for opening the poppet valve.

23. The control-limit valve assembly of claim 21, wherein the push rod and the plunger each have a longitudinal axis and the longitudinal axis of the plunger is transverse to the longitudinal axis of the push rod, further comprising a push pin engaged between the second end of the push rod and the plunger, wherein the plunger has a notch that forms a ramp and the push pin rides on the ramp.

24. A valve for use in a pipe, comprising:

a valve body having a bore for fluid flow through the valve body;

a valve element disposed in the bore for blocking fluid flow through the valve body, the valve element having a limit;

a valve stem connected to the valve element;

an output device connected to the valve stem;

a motor coupled to the output device, the motor having a first port and a second port for receiving or discharging fluid for developing a rotational output;

a shuttle valve in fluid communication with the first and second ports of the motor for delivering fluid to and receiving fluid from the motor; and a control-limit valve assembly having a flow path in fluid communication with the shuttle valve and a normally-closed valve disposed in the flow path, the control-limit valve assembly having a control valve portion adapted to open the normally-closed valve for providing fluid to the shuttle valve and a limit valve portion adapted to close the normally-closed valve for stopping the flow of fluid to the shuttle valve as the valve element approaches its limit.

25. The valve of claim 24, wherein the control valve portion of the control-limit valve assembly includes a control block, the control block having a bore and a piston received in the bore, the piston having a piston rod and a piston head connected to the piston rod, wherein the control block is adapted for receiving a pilot gas on the piston head for moving the piston.

26. The valve of claims 25, wherein the valve disposed in the flow path is a poppet valve received in the bore of the control block, and wherein the limit valve portion of the control-limit valve assembly includes a limit block, the limit block being connected to the control block, the limit block having a limit-block bore and a limit-valve plunger slidingly received in the limit-block bore, the limit-valve plunger being engaged with the poppet valve in the control block.

27. The valve of claim 24, wherein the control valve portion is adapted to open the valve in response to a remote signal.

28. A method for retrofitting an existing gas turbine motor with a new control system, comprising:

removing an existing control system;

providing a shuttle valve in fluid communication with the gas turbine motor, the shuttle valve including:

a shuttle block having opposing ends, a piston-head chamber within the shuttle block at each end, a shuttle-rod bore, a gas-motor port providing a fluid flow path through the shuttle block for each piston-head chamber, a discharge port between the piston-head chambers and a flow path between the discharge port and each piston-head chamber;

an end cap attached to each end of the shuttle block, each end cap having an opening;

a shuttle rod slidingly received in the shuttle-rod bore, the shuttle-rod having opposing ends;

a piston head connected to each end of the shuttle rod;

providing a control-limit valve assembly in fluid communication with the shuttle valve, the control-limit valve assembly having a control valve portion for allowing gas to flow through the control valve portion to the shuttle valve, and a limit valve portion coupled to the control valve portion for preventing the flow of gas through the control valve portion, the control valve portion being adapted to receive a remote signal, the control valve portion having a control valve, wherein the control valve is opened by pressure in the control valve portion and closed by mechanical action in the limit valve portion; and coupling the limit valve portion to the gas turbine motor to detect a limit, wherein the limit valve portion is adapted to close the control valve upon detection of the limit.

* * * * *